(12) United States Patent
Albrecht et al.

(10) Patent No.: US 6,254,050 B1
(45) Date of Patent: Jul. 3, 2001

(54) SAFETY TETHER SYSTEM FOR AIR TOOL AND AIR LINE

(76) Inventors: Martin P Albrecht, 1561 Newman Ave.; Martin Albrecht, 1580 Newman Ave., both of Lakewood, OH (US) 44107

( * ) Notice: Subject to any disclaimer, the term of this patent is extended or adjusted under 35 U.S.C. 154(b) by 0 days.

(21) Appl. No.: 09/303,218

(22) Filed: Apr. 30, 1999

Related U.S. Application Data

(60) Provisional application No. 60/087,409, filed on Jun. 1, 1998.

(51) Int. Cl.[7] ........................................ A47H 1/16
(52) U.S. Cl. ............................ 248/303; 224/271
(58) Field of Search ............... 248/51, 52, 210, 248/211, 238, 304, 301; 224/271

(56) References Cited

U.S. PATENT DOCUMENTS

| | | | |
|---|---|---|---|
| 2,508,258 | * 5/1950 | Heinrich | 248/211 |
| 3,104,859 | * 9/1963 | Hoelzel | 248/211 |
| B1 5,810,225 | 9/1998 | Andrew | 224/271 |

* cited by examiner

*Primary Examiner*—Ramon O. Ramirez
(74) *Attorney, Agent, or Firm*—Donald A. Bergquist

(57) ABSTRACT

A pneumatic tool and line accessory for retaining an air line to air tool, and, in the alternative, an air line to an air compressor outlet fitting, and the like, and for securing an air line to a ladder, a scaffold and the like. The system thus provided also prevents accidental injury to workers. "LINE TAMER SYSTEM" is an easy-to-use accessory for air tools, air lines, and the like. "LINE TAMER SYSTEM" takes all tension of an air line off the worker, making the air line manageable and provides a means of securing the air line to a ladder, scaffold, etc.

8 Claims, 2 Drawing Sheets

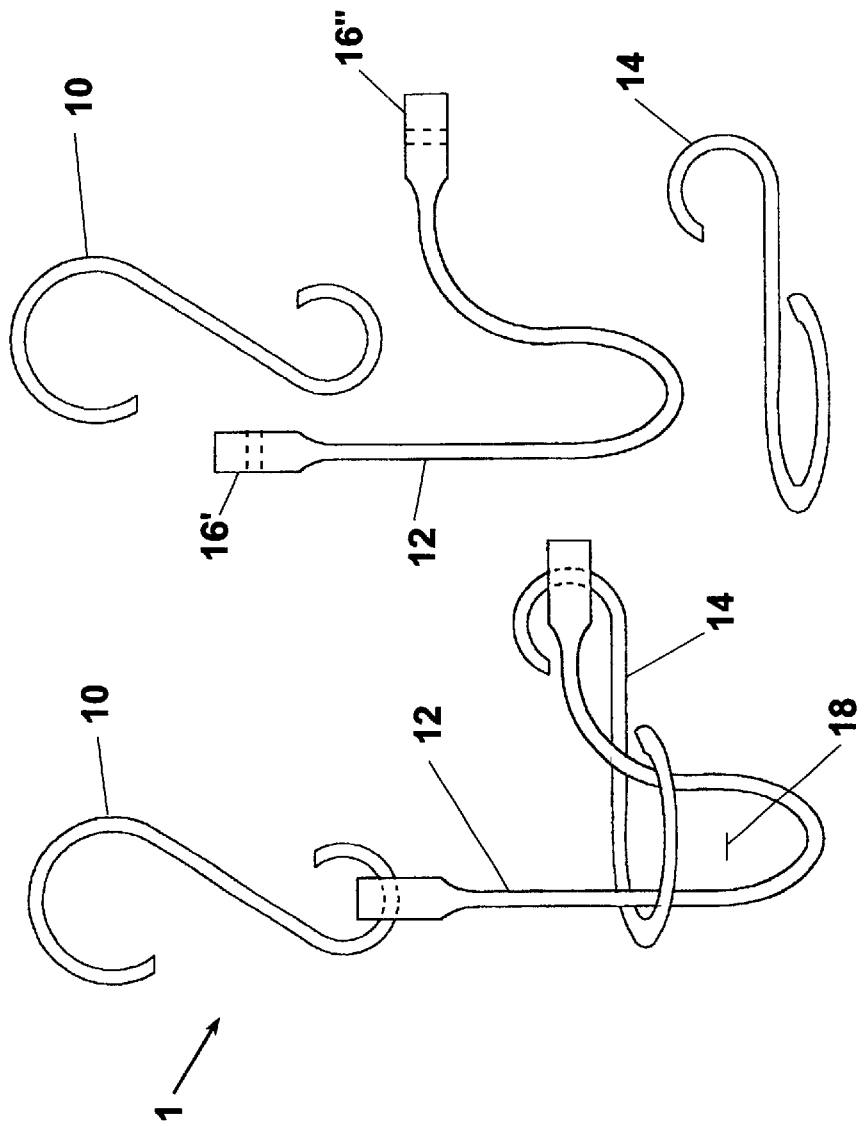

US 6,254,050 B1

SAFETY TETHER SYSTEM FOR AIR TOOL AND AIR LINE

CROSS REFERENCES TO RELATED APPLICATION

This is a continuation of Provisional Application Ser. No. 60/087,409 filed Jun. 1, 1998, "Safety-system for air-tools, air-line and the like."

BACKGROUND OF THE INVENTION

This invention relates generally to the field of pneumatic tools, pneumatic lines, and the like. And more particularly to a pneumatic tool and line accessory for retaining an air line to an air tool, or an air line to an air compressor outlet fitting etc., and securing an air line to a ladder, a scaffold, and the like. Also, for preventing accidental injury to workers. "LINE TAMER SYSTEM" is an easy-to-use accessory, for air tools, air lines and the like. "LINE TAMER SYSTEM" takes all tension of a trailing air line off the worker, making the air line more manageable.

SUMMARY OF THE INVENTION

According to the present invention, there is provided an accessory for pneumatic tools, lines, and the like.

The pneumatic accessory includes a securing means, for securing an air line and the like to a ladder, a scaffold, etc., and is easy to use.

It is an object of the present invention to provide a means of retaining an air tool to an air line and the like.

It is still another object of the present invention to provide a means of retaining an air line to the outlet fitting of an air compressor or pressure tank as such a line is released or connected to the fitting.

It is yet another object of the present invention to provide a means of preventing air tools from falling when they are accidentally dropped, thereby to prevent costly damage to expensive air tools and possible injury to workers.

It is yet another object of the present invention to provide a means of preventing damage to air lines, air fittings, etc., by reducing wear and tear on the lines, the fittings, the couplings, and the like.

It is still another object of the present invention to provide a means of carrying an air tool and air line on a tool belt, so a worker may use both hands while climbing into position, thereby to make climbing more safe.

It is another object of the present invention is to provide a safe working environment for workers by preventing accidental injury.

Other objects and advantages of the present invention will become apparent from the following descriptions, taken in connection with the accompanying drawings, wherein, by way of illustration and example, an embodiment of the present invention is disclosed.

The drawings constitute a part of this specification and include exemplary embodiments to the invention, which may be embodied in various forms. It is to be understood that in some instances various aspects of the invention may be enlarged to facilitate an understanding of the invention.

BRIEF DESCRIPTION OF THE DRAWINGS

The invention may take physical form in certain parts and arrangement of parts, a preferred embodiment of which will be described in detail in the specification and illustrated in the accompanying drawings that form a part hereof, and wherein:

"LINE TAMER SYSTEM" is a set comprising five parts: a first utility hanger (three parts) made up of an S-hook, a rubber tarp strap, and a choker hook; and a second utility hanger and tool carrying hook (two parts) made up of a figure-eight (8) hook, and a tool carrying and line choker hook.

FIG. 1 is a top plan view of the first utility hanger, showing this pneumatic tool and line accessory, illustrating a preferred embodiment of the present invention;

FIG. 2 is a view of the separate parts that make up the first utility hanger of FIG. 1 more clearly showing the parts disassembled;

DETAILED DESCRIPTION OF THE PREFERRED EMBODIMENTS

Figure 4:
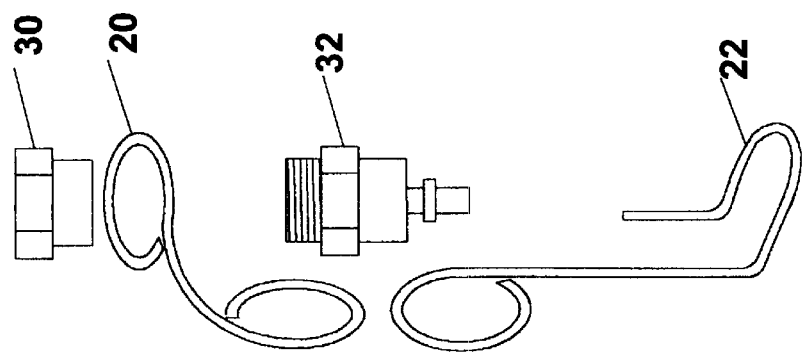
FIG. 4 is a view of the separate parts that make up the second hanger of FIG. 3 more clearly showing the parts disassembled.
Figure 3:
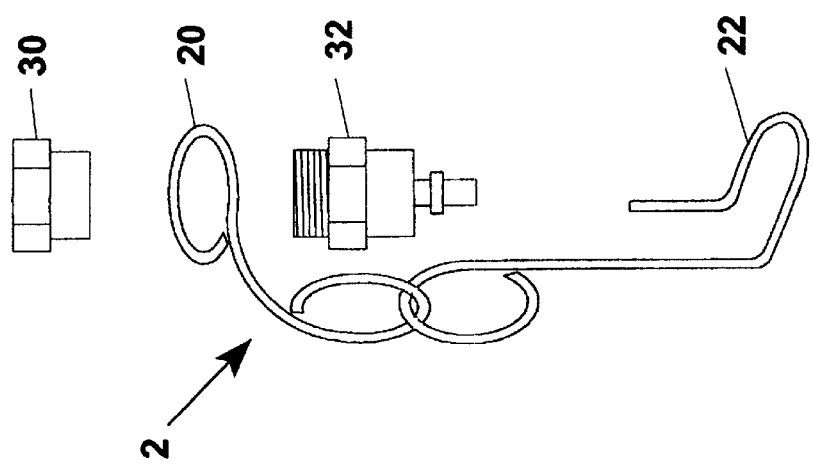
FIG. 3 is a top plan view of a second utility hanger, an accessory for carrying a pneumatic tool and line.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The subject of this patent application is a pneumatic tool and line accessory for air tools, air line, and the like.

"LINE TAMER SYSTEM" is a set comprising five parts: a first utility hanger 1 (three parts) made up of an S-hook 10, a rubber tarp strap 12, and a choker hook 14; and a second utility hanger and tool carrying hook 2 (two parts) made up of a figure-eight hook 20, and a tool carrying and line choker hook 22. 'LINE TAMER SYSTEM" hook elements are preferably made of a rigid material such as metal wire, the gauge of the wire depending on the use application, either light or heavy duty.

The rubber tarp strap 12 that comprises the first utility hanger I has hook-receiving ends 16' 16" that are integral therewith. The first utility hanger has an S-hook 10 with a first loop having a diameter larger than that of a second loop thereof. The second, or smaller loop is connected to one end of the rubber tarp strap 12. This rubber tarp strap is of heavy gauge, the length thereof depends on the particular use intended.

The tarp strap 12 is connected to a choker hook 14 to form a slip-knot. The choker hook 14 comprises a first substantially closed loop and a second loop that has a diameter smaller than the first choker hook loop and that is sufficiently open to removably engage a hook-receiving 16' end of the rubber tarp strap 12. In the preferred mode, the first choker hook loop and the second choker hook loop are integral, having a common leg and are orientated in planes that are mutually perpendicular, these planes intersecting along the common leg that connects the two loops.

The second utility hanger tool carrying and line choker hook 2 has been said to comprise a figure-eight hook 20, and a tool carrying and line choker hook 22. These two parts are linked.

The figure-eight hook 20 comprises two substantially closed loops of substantially equal sizes that are interconnected. In the preferred mode, the two loops are integral, having a common leg that is bent at a substantially 90-degree angle, thereby to orientate the two loops in planes that are mutually perpendicular, each in a plane perpendicular to that of the other, but no length of the common leg is common to both planes.

A first of these figure-eight hook loops is adapted by its size to become loosely trapped between enlarged sections of an air-line fitting 30 on a pneumatic tool and an air-line hose fitting 32 adapted to receive an air hose, these two fittings being in threaded engagement trapping the loop in a manner to allow it to be attached in a swivel engagement with the pneumatic tool.

The second of these figure-eight hook loops is linked with a tool carrying and line choker hook 22, which comprises a closed loop at the proximal end thereof and an elongated open loop at the distal end thereof that is bent at an angle of about 45 degrees and sized to receive between the two bent legs forming said elongated open loop an air hose having an air-hose fitting too large to pass through said open loop on said air hose. Thus, an air hose encompassed by this open loop is trapped by virtue of the fact that the air-hose fitting is larger than the distance between the two bent legs of this open loop and cannot pull away from proximity with the tool to which the figure-8 hook is attached.

Two modes of use are anticipated for the "LINE TAMER SYSTEM". As used in a repair shop, the first utility hanger I is mounted by hanging using the first loop thereof on the rigid air line above a hose-connecting coupling. A slack portion of a flexible air line hose connected to the hose-connecting coupling is fed through a slip-loop 18 formed by a length of the tarp strap 12 pushed through the choker hook 14 the hanger and the slip loop is pulled to grip the hose, leaving a length of slack hose between the slip loop and the hose-connecting coupling so any tension on the hose will be absorbed by the tarp strap 14 so the fitting is not stressed. This first utility hanger I takes all tension of line when a worker pulls on the air line hose.

The second utility hanger 2 has already been attached to the rigid air line before the hose-connecting coupling was installed, being trapped there by the size of the coupling. Thus, the open loop 22 of the second utility hanger is available to engage the slack portion of the flexible air line hose as a safety against the hose-end flying away in case of an accidental or intentional disconnection of the coupling. Used this way the tool carrying and line choker hook 22 forms a safety cage for the fitting of the flexible air line, preventing the fitting from accidentally striking a worker as the fitting is released or connected.

The second mode of use is at the tool end of the flexible pneumatic hose where a pneumatic tool is attached. Thus, as used by a contractor's worker at a job site, an air line is fed through the slip-knot of the first utility hanger I of "LINE TAMER SYSTEM" and some play on air line is fed out, then secured in the slip-knot by the tarp strap 12. The worker then hooks the first utility hanger 1 on his tool belt, so he may use both hands while climbing a ladder or the like.

The second utility hanger 2 is attached to the air inlet of a pneumatic tool to be used in conjunction with the air line. The worker hooks the tool carrying and line choker hook portion 22 of the second utility hanger 2 to his belt. Now, with tool and air line hanging from his belt, he has both hands free to climb ladders, scaffolds, and the like.

Once in position, the worker removes the hook 10 of the first utility hanger 1 from his tool belt and secures the hook 10 to the ladder, scaffold, or the like. The worker then determines how much play is needed in the air line to allow safe completion of his task using the pneumatic tool, adjusts the first utility hanger 1; then he removes the second utility hook from his belt, secures the air line in the choke loop 22 and connects the air lie to the tool. As a safety measure, the worker should then check that the length of play on air line will provide a safe working distance from the ground, should the tool be dropped from any elevated perch on which he is working.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A safety accessory for retaining a pneumatic tool and a pressurized pneumatic line that is in use connected to said tool by means of a quick-connect coupling comprising a tool-engaging part and a hose-engaging part, said accessory for the purpose of retaining said line in a linked relationship to said tool as said coupling is disconnected, said accessory comprising a figure-eight hook comprising two substantially closed loops that are interconnected, one loop adapted in size to be loosely trapped between said tool and an enlarged section of said tool-engaging part of said quick-connect coupling, thereby affixing said figure-eight hook to said tool in a swivel engagement, and a second loop to which is linked a hose-line hook comprising a linking hook for linking engagement forming a proximal end of said hose-line hook and a line-engaging open loop forming a distal end thereof, said open loop being adapted by size to loosely straddle and encircle said hose-line and to trap within it said hose-engaging part of said quick-connect coupling.

2. The safety accessory of claim 1 wherein said pneumatic tool is a portable pneumatic tool.

3. The safety accessory of claim 1 herein said pneumatic tool is an air compressor.

4. The safety accessory of claim 1 wherein said pneumatic tool is a fixed compressed air line.

5. A safety accessory for transporting and retaining a pneumatic tool and a pressurized pneumatic line that is in use connected to said tool by means of a quick-connect coupling comprising a tool-engaging part and a hose-engaging part, said accessory for the purpose of hands-fee carrying of said tool and line combination while climbing and for relieving mechanical stress on said quick-connect coupling, said accessory comprising:

an S-hook for providing easily-removed attachment to any of a multitude of supports;

a tarp strap having a hook-receiving means at each end thereof and thereby attached at a proximal end thereof to said S-hook;

a choker hook attached at a distal end of said tarp strap by a first choker hook loop and having a second substantially closed loop through which a bight of said tarp strap may be passed to create a slip loop for encircling and gripping a slack portion of said pneumatic line when said slip loop is pulled taught.

6. The safety accessory of claim 5 wherein said pneumatic tool is a portable pneumatic tool.

7. The safety accessory of claim 5 wherein said pneumatic tool is an air compressor.

8. The safety accessory of claim 5 wherein said pneumatic tool is a fixed compressed air line.

\* \* \* \* \*